No. 780,338.

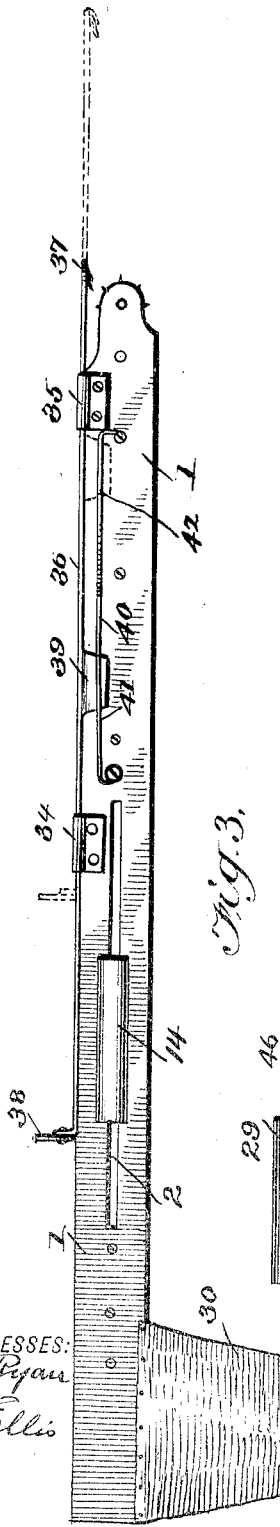

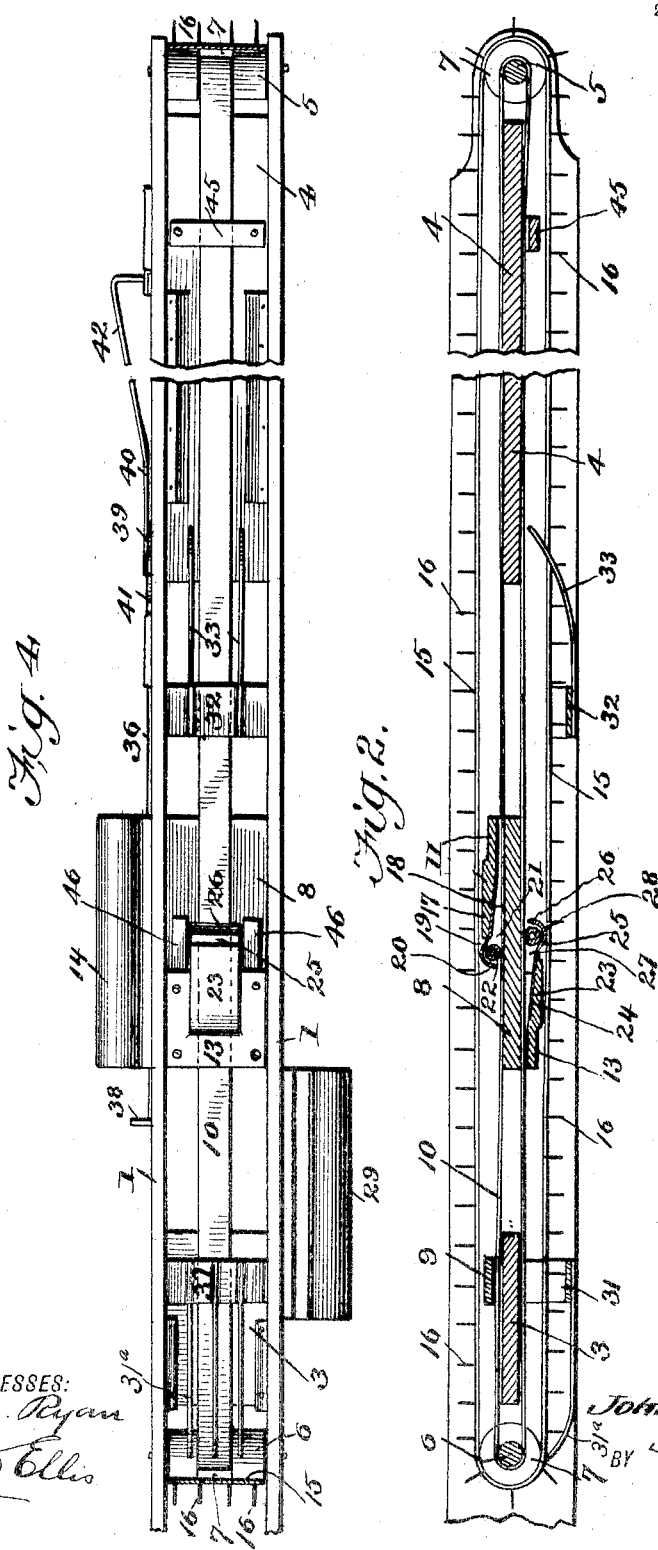

Patented January 17, 1905.

UNITED STATES PATENT OFFICE.

JOHN COURTENAY GROVES, OF SELMA, ALABAMA.

COTTON-PICKING MACHINE.

SPECIFICATION forming part of Letters Patent No. 780,338, dated January 17, 1905.

Application filed September 20, 1904. Serial No. 225,194.

*To all whom it may concern:*

Be it known that I, JOHN COURTENAY GROVES, a citizen of the United States, and a resident of Selma, in the county of Dallas and State of Alabama, have invented a new and useful Improvement in Cotton-Picking Machines, of which the following is a specification.

This invention relates to cotton pickers or harvesters; and it consists, substantially, in the construction and organization of parts hereinafter more particularly described, and pointed out in the claims.

The invention has reference more especially to cotton pickers or harvesters which are both hand-supported and hand-operated; and one of the principal objects thereof is to overcome numerous disadvantages and objections common to many other contrivances hitherto devised for similar purposes.

A further object is to provide a cotton picker or harvester comprising few parts and one which may be easily operated to pick or harvest the cotton without injury to the unopened bolls on the standing plants in the field.

A further object is to provide a cotton picker or harvester which is comparatively simple in the construction and organization of the elements comprising the same and which may also be operated with less fatigue and strain to the operator.

A still further object is to provide a cotton picker or harvester which is thoroughly effective and reliable in use and which is also comparatively inexpensive to manufacture, besides possessing the capacity for long and repeated service.

The above and additional objects are attained by means substantially such as are illustrated in the accompanying drawings, in which—

Figure 1 is a side elevation of a cotton-picking machine or harvester embodying my improvements. Fig. 2 is substantially a central longitudinal sectional view thereof. Fig. 3 is a top plan view. Fig. 4 is a bottom plan view. Fig. 5 is a transverse sectional view in detail to more fully indicate the construction of certain parts.

Before proceeding with a more detailed description it may be stated that in the form of my improvements herein shown I employ a suitable frame structure for supporting the several operative elements of the machine, and carried by said frame is a specially-constructed reciprocatory slide, combined with which are specially-constructed clutch devices to impart indirectly an intermittent rearward motion to a belt from which project numerously-distributed teeth for effecting the gathering and picking of the cotton either while on the boll or on the ground. I also employ special means for gathering the cotton onto the picker-belt from parts of the standing plants which otherwise could not be conveniently reached, and while I have herein represented my improvements in a certain preferred embodiment it will be understood, of course, that I am not limited to the precise details thereof in practice, since immaterial changes therein may be resorted to coming within the scope of my invention.

Referring to the accompanying drawings by the designating characters marked thereon, 1 1 represent the longitudinal side portions of the supporting-frame of the machine, said side portions being of any preferred form and material and having therein corresponding longitudinal slots 2, as shown. The said side portions of the supporting-frame are of any preferred dimensions, and they are also spaced apart a suitable distance and held in rigid relation to each other in any suitable way, preferably by means of a short horizontal connecting member 3, located a suitable distance from the rearward end of the machine, and a longer horizontal connecting member 4, extending to a suitable distance rearwardly of the machine from its forward end, said horizontal connecting members being disposed substantially in line with the longitudinal slots 2 in the side portions 1 1 of the supporting-frame.

Rotatably mounted at the forward end of the machine, between the side portions of the supporting-frame, is a pulley 5, while also mounted between the said side portions of the frame, a short distance from the rearward end of the machine, is a similar pulley 6, each of said pulleys being formed intermediate the ends thereof with a circumferential groove 7, as more clearly indicated in Figs. 2 and 4.

As will be observed, the inner ends of the horizontal connecting members for the side portions of the supporting-frame terminate at the rearward and forward extremities, respectively, of the longitudinal slots 2 in said side portions, so that a space is provided for the movement of a longitudinal reciprocatory slide 8, the sides of which extend into and work within the said slots. The forward movements of said slide are limited by the said inner end of the horizontal connecting member 4, while the rearward movements thereof are limited by the corresponding end of the horizontal connecting member 3, this latter member being formed or provided on its upper surface with a guide 9 for an endless narrow band 10, the upper traveling portion of which passes through another guide 11, carried on the upper surface of the said reciprocatory slide 8, and the lower traveling portion of which passes through substantially a similar guide 13, carried by the slide on the under side thereof and preferably (though not essentially) located at the reverse end of the said slide. This slide is provided at one of its side edges with a grip or handle 14, to be taken hold of by the operator for imparting the desired reciprocatory motion to the slide, and it will be noted that the endless traveling band 10 is received by and works in the circumferential grooves 7 of the pulleys 5 and 6, the outer surface of said band being within the plane of those portions of the said pulleys having the greatest diameter, said portions being located on either side of the said grooves and around which is carried an endless traveling belt 15, which is preferably of a width substantially equaling the distance between the inner surfaces of the side portions of the supporting-frame of the machine and from which project numerously-distributed teeth 16 for effecting the picking or harvesting of the cotton, in the manner hereinafter explained.

Various means may be employed for effecting the engagement of the reciprocatory slide with the traveling band 10; but preferably I employ the devices herein shown. Thus rigid with the upper surface of the guide 11 on the slide is a rearwardly-extending plate 17, to which is rigidly attached a shoe 18, which is slightly inclined upwardly and rearwardly at 19 and thence downwardly at 20, thereby forming a space 21 between the inner side of the said shoe and the upper side of the slide, which is of a gradually-decreasing width forwardly of the machine. (See Fig. 2.) Located within the said space is a roller 22, and it is apparent that when the reciprocatory slide is operated rearwardly the said roller will be carried forwardly between the shoe and the adjacent surface portion of the slide, thereby causing the roller to bind upon the upper traveling portion of the band 10 in such manner as to cause said portion to travel rearwardly of the machine. Similarly rigid with the under surface of the guide 13 is a forwardly-extending plate 23, provided at its forward end with a shoe 24, slightly inclined downwardly and forwardly at 25 and thence upwardly at 26, and confined between the space 27 thus formed between the said shoe and the under side of the slide is a roller 28, which on the forward motion of the slide is caused to bind upon the under traveling portion of the band 10, consequently carrying the upper portion of this band rearwardly or in the same direction as before. In this way the upper portion of the band 10 is intermittently operated in a rearward direction, and it will be noted that the motion is transmitted to the pulleys 5 and 6, and consequently a corresponding intermittent motion will be imparted to the endless traveling belt 15, it being mentioned at this point that the picker-teeth projecting from said belt are sufficiently rigid to effectively gather the cotton, while at the same time being flexible enough to release all stalks, &c., carried upon the said belt 15.

The operating grip or handle for the reciprocatory slide is preferably located at the right of the machine, while secured to the outer surface of the side portion 1 at the left of the machine is a stationary handle or grip 29, by which the machine is held by the operator during the operation of picking or harvesting of the cotton.

Located at the under side of the rearward end of the machine is a chute 30, through which the cotton falls from the belt 15 into a sack carried by the operator, said chute serving as a guide for this purpose. To facilitate the dropping of the cotton from the said belt into the said chute, I secure to the inner surfaces of the side portions of the supporting-frame of the machine a yoke 31, rearwardly from which project a plurality of upwardly-curved arms 31ª, the free extremities of which terminate beneath the pulley 6, it being mentioned that said arms are so spaced from each other as not to interfere with the teeth on the traveling belt 15 nor with the movements of the said belt. In order to prevent sagging of the said belt, I also employ between the inner surfaces of the side portions of the supporting-frame of the machine a member 32, having forwardly-projecting upwardly-curved arms 33, also so spaced as not to interfere with the teeth projecting from the belt, yet at the same time exerting a slight pressure against the under traveling portion of the belt, thereby subserving the intended function thereof.

Secured to one side of the machine are guides 34 and 35 for a rod 36 of any preferred length and thickness, said rod being formed or provided at the forward end thereof with a right-angled claw 37 and at its rearward end with a finger-grasp 38, said rod being also provided intermediate of its ends with a pendent wing 39, which works within a longitudinal guide 40, having its ends secured to the side of the machine. The rearward portion 41 of said guide is so bent as to be within close proximity to the side of the machine, while the forward portion 42 thereof is bent outwardly or away from the side of the machine, as clearly shown in Figs. 3 and 4. It sometimes happens that the forward end of the machine cannot be directed sufficiently close to the cotton-bolls on the plants, but by projecting the said rod 36 forwardly in its guides (see dotted lines, Fig. 1) and then partially rotating the same in such manner as to cause the right-angled claw 37 thereof to take into the cotton it will be seen that when the rod is again drawn rearwardly the cotton will be deposited upon the endless intermittently-traveling belt 15, all of which is apparent. When the said rod 40 is not to be used in the manner and for the purpose stated, the same is drawn rearwardly of the machine, as shown in full lines, Figs. 1, 3, and 4, said pendent wing 39 thereof being confined between the side of the machine and the rearward portion of the guide 40 in such manner that the rod is securely held in position to prevent the same from working forwardly of itself or in any way interfering with the usual operations of the machine. Also by projecting the said rod forwardly in the manner explained and then properly manipulating the machine the right-angled claw thereof may be employed for gathering loose cotton from the ground or other inaccessible places for the purpose of being carried to and deposited upon the picker-belt.

From the foregoing it will be seen that a cotton picker or harvester constructed in accordance with my invention is comparatively simple as well as easily operated or manipulated and also that the elements thereof may be readily put together and taken apart for any purpose desired, the machine in its entirety being very light in weight and occupying but small space in storage or transportation.

It will of course be understood that I am not confined to any special form of supporting-frame for the different elements, nor to the particular devices herein shown for effecting the clutching or gripping upon the upper and lower traveling portions of the band 10, since they may be modified in immaterial respects without altering the character or intended scope of the invention. A suitable guide may also be employed for the under portion of the endless traveling band, such as indicated at 45, on the under side of the longer horizontal connecting member 4 between the side portions of the frame of the machine.

If desired, a strap may be attached at suitable points to the side portions of the supporting-frame of the machine, to be carried over the shoulder of the operator, and thus partially sustain the weight of the machine as the latter is operated, and it should also be stated that the side edges of the guides 11 and 13 on the upper and lower sides of the slide 8 move against the inner surfaces of the side portions of the supporting-frame, and thus the said slide is prevented from lateral displacement from the longitudinal grooves in which it works. Each of the surfaces of the slide is provided with blocks 46, situated before the ends of the roller elements of the clutch devices, thus to retain the rollers within the shoes therefor during the operation of the said slide.

Having thus described my invention, what I claim as new, and desire to secure by Letters Patent, is—

1. A cotton-harvesting machine, comprising a supporting-frame, a reciprocatory slide, an endless belt having picker-teeth thereon, and means intermediate of said slide and belt for operating the latter to present successive rearwardly-moving portions thereof to the cotton to be harvested.

2. A cotton-harvesting machine, constructed of a supporting-frame, an endless belt having picker-teeth thereon, and means for operating said belt to present successive rearwardly-moving portions thereof to the cotton to be harvested, said means comprising an endless band, a reciprocatory slide, and devices for clutching a portion of said band on movement of the slide in either direction.

3. A cotton-harvesting machine, constructed of a supporting-frame, an endless belt having picker-teeth thereon, and means for operating said belt to present successive rearwardly-moving portions thereof to the cotton to be harvested, said means comprising an endless band, a hand-operated reciprocatory slide, and devices for clutching a portion of the band on movement of the slide in either direction.

4. A cotton-harvesting machine, constructed of a supporting-frame, an endless belt having picker-teeth thereon, and means for operating said belt to present successive rearwardly-moving portions thereof to the cotton to be harvested, comprising an endless band, a reciprocatory slide, and devices carried by the slide for clutching a part of the band on movement of the slide in either direction.

5. A cotton-harvester, constructed of a supporting-frame, an endless belt having picker-teeth thereon, and means for operating said belt to present successive, rearwardly-moving portions thereof to the cotton to be harvested, the same comprising an endless band, a reciprocatory slide, and devices for clutching a portion of the band on movement of the slide in either direction, the slide having guides on its opposite sides for the band.

6. A cotton-harvesting machine, comprising a supporting-frame, pulleys mounted at the forward and rearward ends thereof respectively, and provided centrally with circumferential grooves, an endless band working in said grooves, a picker-belt operated by the pulleys, a reciprocatory slide, and means for alternately clutching different portions of said band to impart to one portion thereof an intermittent motion rearwardly of the machine.

7. A cotton-harvesting machine, comprising a supporting-frame, pulleys mounted at the forward and rearward ends thereof respectively, and provided centrally with circumferential grooves, an endless band working in said grooves, a picker-belt carried by the pulleys, a reciprocatory slide, and means for alternately clutching different portions of said band to impart to one portion thereof an intermittent motion thereof rearwardly of the machine, said means being carried by the slide.

8. A cotton-harvesting machine, comprising a device adapted to be projected beyond the forward end of the machine and provided with a picker-claw, and means for normally retaining the device against movement with respect to the machine.

9. A cotton-harvesting machine, comprising a device adapted to be projected beyond the forward end of the machine and partially rotated and having at its forward end a picker-claw, and means for normally retaining the device against rotatory or other movement with respect to the machine.

10. A cotton-harvesting machine, comprising guides and a rod movable forwardly and backwardly therein, provided at its forward end with a picker-claw, and means for normally retaining the rod against movement with respect to the machine.

11. A cotton-harvesting machine, comprising guides, a rod movable therein adapted to be projected beyond the forward end of the machine and partially rotated, said rod having a pendent wing, and provided at its forward end with a picker-claw, and a guide on the machine for the wing.

12. A cotton-harvesting machine, comprising guides, a rod movable therein adapted to be projected beyond the forward end of the machine and partially rotated, said rod having a pendent wing and provided at its forward end with a picker-claw, and a guide on the machine for the wing, the rearward portion of said guide being in close proximity to the side of the machine, and the forward portion thereof bent outwardly.

13. A cotton-harvesting machine, comprising a supporting-frame, a reciprocatory slide, an endless traveling belt having picker-teeth thereon, means intermediate of the slide and belt for operating the latter to present successive rearwardly-moving portions thereof to the cotton to be harvested, and means for preventing sagging of said belt.

14. A cotton-harvesting machine, comprising a supporting-frame, a reciprocatory slide, an endless traveling belt having picker-teeth thereon, means intermediate of the slide and belt for operating the latter to present successive rearwardly-moving portions thereof to the cotton to be harvested, and a yoke secured to the under side of the machine, near the rearward end thereof, and provided with rearwardly-extending and upwardly-curved arms to facilitate the dropping of the cotton from the belt into a receptacle therefor.

15. A cotton-harvesting machine, comprising a manually-operated reciprocatory slide, and picker devices actuated by said slide, including an endless band and an endless belt having teeth thereon.

16. A cotton-harvesting machine, constructed of a supporting-frame, an endless belt having picker-teeth thereon, and means for operating said belt to present successive rearwardly-moving portions thereof to the cotton to be harvested, said means comprising a reciprocatory slide, an endless band, and clutch devices on the slide, including movable rollers, said slide being provided with means for preventing endwise displacement of the rollers.

JOHN COURTENAY GROVES.

Witnesses:
N. WALLER,
F. M. STILLWELL.